United States Patent
Becker et al.

[19]

[11] Patent Number: 6,044,144
[45] Date of Patent: Mar. 28, 2000

[54] NETWORK CALL PARKING MANAGER

[75] Inventors: Steven C. Becker; Christine S. Chaney, both of Colorado Springs; Kimberly A. Smith, Franktown, all of Colo.; Frances D. E. Taylor, Falls Church, Va.

[73] Assignee: MCI Communications Corp., Washington, D.C.

[21] Appl. No.: 08/796,839

[22] Filed: Feb. 7, 1997

[51] Int. Cl.[7] ...................................................... H04M 3/00
[52] U.S. Cl. ........................ 379/265; 379/266; 379/219; 379/221; 379/134
[58] Field of Search ..................................... 379/265, 266, 379/309, 201, 207, 219, 220, 222, 221, 133, 134, 139, 114, 112, 113, 111; 370/270

[56] References Cited

U.S. PATENT DOCUMENTS

| | | | |
|---|---|---|---|
| 4,953,204 | 8/1990 | Cuschleg, Jr. et al. | 379/266 |
| 5,329,583 | 7/1994 | Jurgensen et al. | 379/265 |
| 5,528,678 | 6/1996 | Kaplan | 379/265 |
| 5,530,744 | 6/1996 | Charalambous et al. | 379/265 |

OTHER PUBLICATIONS

Data Communications Technical Reference, TR 54022, "AT&T Intelligent Call Processing (ICP) Service, Signaling System No. 7 Network Interface Specification," Nov., 1991.

*Primary Examiner*—Scott Wolinsky
*Assistant Examiner*—Benny Q. Tieu

[57] ABSTRACT

A parking manager manages calls to be parked and parking resources on one or more parking platforms, and can be used in a system that combines the functionalities of call parking and intelligent call routing. The parking manager provides management of parking resources and complete control of the call throughout the entire duration of the call. The parking manager makes a common pool of parking resources available to all customers, and thus increases the availability of parking resources at call center ACDs and other customer premise equipment.

14 Claims, 8 Drawing Sheets

NETWORK CALL PARKING MANAGER

CROSS REFERENCE TO RELATED APPLICATIONS

This application is related to commonly-owned, applications filed concurrently herewith, entitled "Remote Data Gateway" having application Ser. No. 08/796,246 filed Feb. 7, 1997 and issued as U.S. Pat. No. 5, 917,900 on Jun. 29, 1999 and "System and Method for Call Park and Transfer in a Telecommunications Network" having application Ser. No. 08/796,840 filed Feb. 7, 1998 was abandoned, which are incorporated herein by reference in their entirety.

BACKGROUND OF THE INVENTION

1. Field of the Invention

The present invention relates generally to computer telephony, and more particularly to parking a call on a telephone network.

2. Related Art

The proliferation of call centers within many different industries has introduced new requirements into the functionality of a telecommunications network. A call center is typically a platform and location used by a business for customer services, operator services, telemarketing, or other such purposes. At a typical call center, individuals known as "agents" interact with callers to accomplish these purposes. Callers commonly access a call center by dialing a 1-800 number, though any type of telephone number may be used.

Many call centers utilize automatic call distributors (ACD) to queue calls for agents, thus enabling the call center to support a number of simultaneous calls that exceeds the number of call center agents. Even so, it is common for an ACD at a call center to become overburdened with calls. Such is the case when the trunks to an ACD from a telecommunications network become overutilized due to high volumes of calls. Additionally, many call center managers (hereinafter referred to as "customers") do not wish to buy an ACD for their call center, yet desire call queuing functionality so that callers do not encounter busy signals. From a business perspective, it is not acceptable for callers to encounter a busy signal and so find themselves unable to reach a call center.

Thus, telecommunications network carriers (hereinafter referred to as "carriers") have recognized the need for a capability to hold a call on a carrier network if the intended destination is unavailable. The process of holding a call on a network is generally referred to as "call parking." In addition, many customers operate multiple call centers, at different physical locations, that serve a single telephone number (for example, a 1-800 number). Thus, there is a need to determine the most available and cost-efficient destination among multiple destinations to which to route a call.

Intelligent routing applications can be used to route a call to one of multiple such destinations based on a number of criteria. In addition to call center availability, other criteria include the time of day, day of week, location of call origination, proximity of call origination to call destination, and caller-entered input (for example, digits entered on a telephone set keypad). Customers may also wish for callers to be routed to applications that provide call treatments, such as recordings or voicemail.

System requirements are imposed not only by customers, but also by carriers. One such requirement is minimizing the network-based cost of routing a call. Intelligent call routing applications are available to minimize such costs on a call-by-call basis.

While such intelligent routing applications are currently available, combining them with call parking remains a challenge. Conventional approaches do not provide for centralized, network-based call parking that can service multiple call centers. Conventional approaches also do not provide an adequate means for managing the network resources for parking a call. In particular, a mechanism does not exist for determining the availability of resources to park a call prior to routing the call to a call center or other termination.

Conventional approaches also do not provide for controlling the disposition of a call throughout the entire duration of the call, including the time when a call is parked. Further, it is desirable to provide a selection of call treatments to apply to a call after it has been parked.

SUMMARY OF THE INVENTION

The present invention is a system and method for managing calls and resources on multiple parking platforms. The system includes a parking slot manager configured to manage call parking resources, including parking platforms and parking slots, and a call manager configured to manage each call to be parked throughout the parking process.

The system also includes data stores for parking slot usage data, parking slot resource data, call state data, and destination label/termination address translation data. The parking slot usage data store stores and maintains parking slot status for each parking platform. The parking slot resource data store stores and maintains the allocation of parking slots to specific customers. The call state data store stores and maintains the status of each call to be parked. The destination label/termination address translation data store stores and maintains data to translate a destination label to one or more physical network routing addresses.

The system also includes a router interface configured to interface to originators of parking requests, a call center data manager (CCDM) interface configured to interface to a CCDM, and at least one parking platform interface configured to interface to a parking platform. A CCDM provides customer provisioning information to the parking manager, and provides communications between the parking manager and the customer's order entry site (for example, a service workstation). The customer provisioning information includes customer order information based on the customer order.

The method includes the steps of receiving a parking request to park a call made to a call destination for a customer, assigning a parking platform to the call based on the parking requirements in a customer order, and sending a reply to the originator of said parking request identifying the assigned parking platform. The method further includes the steps of receiving a routing request to route the parked call to the call destination, and directing the parking platform to release the parked call and route the parked call to the call destination or an alternative call destination. A predetermined number of parking slots are allocated to a customer based on the customer's order. The customer order can also specify a functionality to be applied to calls for the customer parked on at least a portion of the parking slots allocated to the customer.

The present invention also monitors the status of calls associated with call parking requests; and collecting call parking data for each customer. The call parking data describes at least one of the number of calls parked, number of calls abandoned, number of calls dropped, number of calls released, number of calls default routed, and the duration for which calls are parked. The call parking data can be reported to the customer. The customer can use this data to better manage its call center. The customer can also use this data to inform a parked caller of the status of his call. For example, the customer can inform the caller of the duration for which his call is expected to be parked.

One advantage of the present invention is that it permits parked calls to be released in any order, regardless of the order in which they were parked.

Another advantage of the present invention is that it permits load balancing among parking platforms.

Another advantage of the present invention is that it permits a customer to specify the call treatment to be applied to the parked calls. The call treatments can include the collection of caller-entered digits to be outpulsed to the customer site when the call is released. The call treatment for a parked call can also be selected based on the character of a call. For example, the call treatment for a parked call can be based on the automatic number identification (ANI) of the call.

Another advantage of the present invention is that it permits the customer to specify an alternative call destination for a parked call.

Another advantage of the present invention is that it permits the destination of a parked call to be selected based on the character of the call. For example, the destination of a parked call can be based on the ANI of the call.

Another advantage of the present invention is that it provides detailed reports regarding call parking and transfer activity that enable a customer to better manage its premise equipment and call parking strategy.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
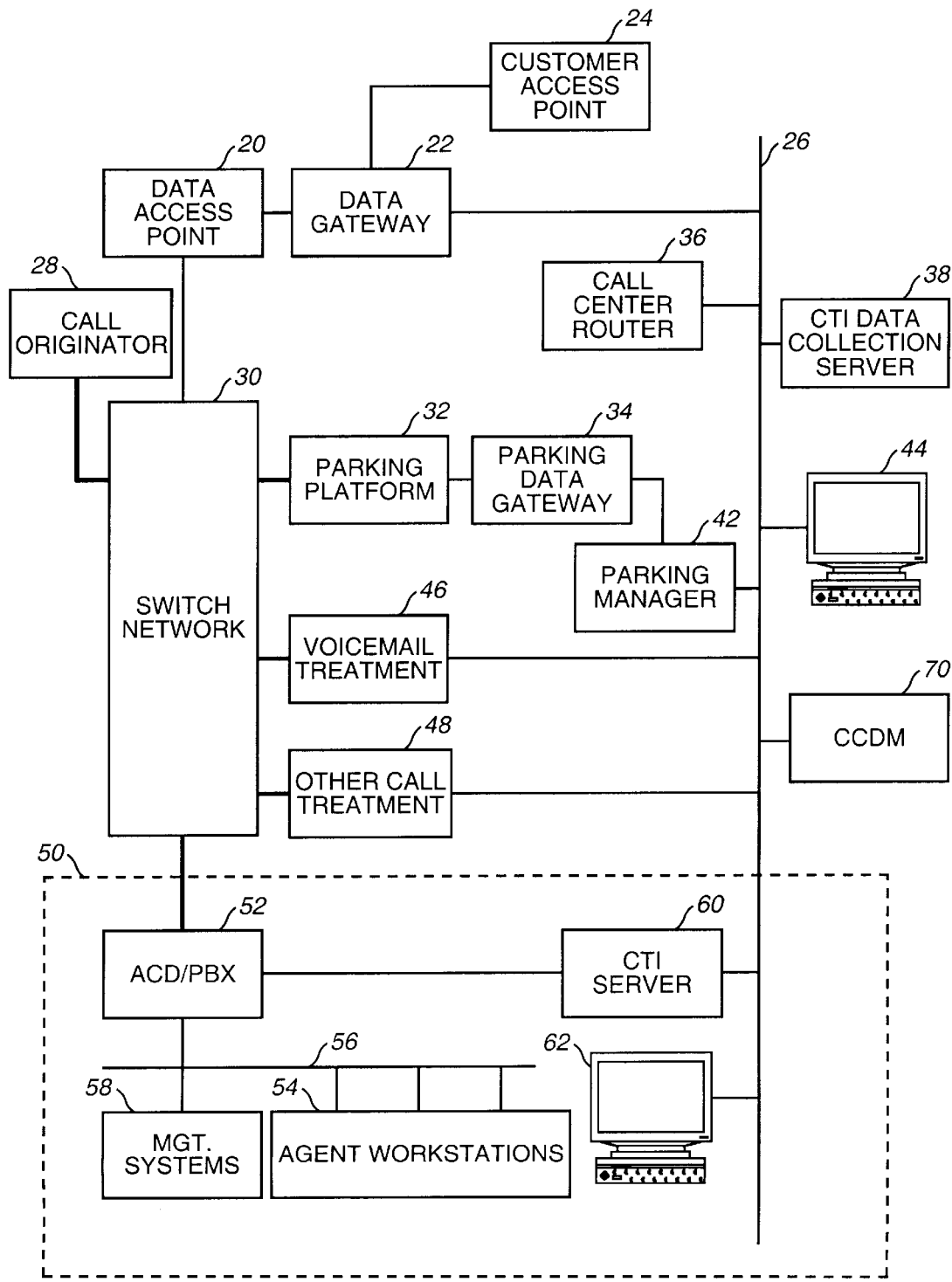
FIG. 1 is a block diagram illustrating an example system architecture for a preferred embodiment of a call parking system.

The present invention is a system and method for managing calls and resources on multiple parking platforms, and can be used in a system that combines the functionalities of call parking and intelligent call routing. The present invention provides management of parking resources and complete control of the call throughout the entire duration of call parking. The present invention can be used with a centralized, network-based platform for call parking, so that one or more such parking platforms can be used to park calls that are intended for any call center or other destination, thus improving the efficiency of call parking resources. The present invention thus makes a common pool of parking resources available to all customers, which maximizes the availability of call parking and queuing resources at call center ACDs and other customer premise equipment. In addition, once a call is parked on a parking platform, it can be released and transferred to a destination other than the originally-intended destination.

Overview

The present invention is a parking manager that can be used in a network call parking system, such as that described in application Ser. No. 08/796,840. The parking manager provides means for controlling a call throughout the duration of the call. In one embodiment disclosed in application Ser. No. 08/796,840, a call router receives requests for call routing from an enhanced call routing system that is part of a switch network. If the call router determines that the desired destination is unavailable, it sends a query for call parking to the parking manager. In a preferred embodiment, this query includes the ANI of the caller, the dialed number (i.e., 800 number), and a customer identification code to identify the customer (i.e., owner of the 800 number). The parking manager returns a response to the call router, indicating a parking platform to which to route the call. The call router routes the call to the indicated parking platform, where the call is then parked. In one embodiment, one parking manager can serve multiple call routers.

A parking platform refers to any system of hardware components and software that function to hold a call, apply a specified treatment, and release the call to its intended destination upon notification from the parking manager. A parking platform may be designed to provide additional functions, such as voice response menu routing, dual tone multi-frequency (DTMF) input capabilities, and speaker-independent voice recognition. In a preferred embodiment, a system known in the industry as an Audio Response Unit (ARU), which consists of a network audio server and an intelligent call processor, is used as a parking platform.

A parking platform may comprise one or more ARUs, part of a single ARU, or combinations of ARUs and/or other types of equipment. According to one embodiment, a parking platform should support telephony interface ports, have an application processor, and have a data interface for communications with the parking manager. The telephony ports are used to park calls, and the call capacity of a parking platform is a factor of the number of such ports. One or more ports may be used to park a call.

The parking manager tracks the parking activity at each parking platform using a logical construct known as a "parking slot." A parking slot is the ability of a parking platform to park one call. One parking slot requires one or more telephony ports on a parking platform. The parking manager tracks the number of parking slots on each parking platform. The call parking capacity of a parking platform may actually be half of the number of ports, since a parking platform may perform outbound calling for a parked call. In this case, two ports are used for a single parked call.

In addition to tracking the total number of slots for each parking platform, the parking manager tracks the number of currently available slots. In a preferred embodiment, an increment/decrement counter is maintained for each parking platform. The counter is decremented when a call is routed to the parking platform and incremented when a call is abandoned, dropped or extended from the parking platform.

The parking manager receives customer orders from a customer order entry site via a CCDM. In one embodiment, this site is a user workstation. A customer order specifies the parking requirements for the customer. In a preferred embodiment, a customer order includes the number of parking slots required and the functionality (also referred to as "call treatment") required of each parking slot. Example parking slot functionalities include playing a recorded message, voice response menu routing, collection of caller-entered digits, voice recognition, voicemail, faxmail, and the like.

In response to a customer order, the parking manager allocates the requested number of slots having the requested functionality. In a preferred embodiment, all parking platforms, and all parking slots, can support all of the functionalities offered by the carrier. Thus, a customer's required parking slots are not allocated to particular parking platforms or slots, but rather are allocated across all of the parking platforms and slots in the call parking system. A call is assigned to a particular parking platform when call parking is requested for the call. The parking manager manages these allocations.

In an alternative embodiment, not all of the parking platforms and parking slots in the parking system support all of the functionalities offered by the carrier. In this embodiment, the parking manager tracks the functionality of each slot and allocates calls to parking platforms based on the functionality of available parking slots.

Thus, in a preferred embodiment the number of slots allocated to a customer are applied to total slot availability across all parking platforms. In addition, one customer's slot allocation is segregated from those of other customers, so that one customer's call parking does not impact slot availability for another customer. This also is managed by the parking manager.

The parking manager is capable of supporting any type of parking platform. In response to a query from a router for call parking, the parking manager returns a Destination Label (DL), which specifies the parking platform to which the call should be routed for call parking. A DL is a generic specification of a call routing destination, and is independent of the type of destination. In one embodiment, a DL specifies a trunk group terminating to a parking platform from a switch on a switch network. In another embodiment, the DL simply identifies the parking platform. The DL can be translated to a network routing address elsewhere in the network or call parking system. The DL can be chosen based on caller-entered digits. Additional information can be included in, or appended to, a DL. This information can include a destination override, such as a dialed number identification system (DNIS) override. In one embodiment, this override specifies digits to be outpulsed to a destination ACD, for example, to reach a particular agent. Other forms of DLs can be employed without departing from the spirit and scope of the present invention, as would be apparent to one skilled in the relevant art.

In a preferred embodiment, the parking manager does not assign a call to be parked to a specific parking slot. Rather, the parking manager assigns the call to a specific parking platform or portion of a parking platform based on parking platform availability. The parking manager specifies this parking platform to the router in the DL.

One advantage of this arrangement is that the parking manager need not know the character of each parking slot on a parking platform; the parking manager need know only the number of parking slots. Thus in a preferred embodiment, for each platform the parking manager tracks the number of total parking slots, the number of parking slots in use, and the number of available parking slots. An available parking slot is one that is functional and not currently occupied by a parked call.

The parking manager can be used for total resource management of call parking resources. In one embodiment, parking slots have differing functionalities.

The parking manager permits customers to select parking slot functionality based on the character of the call. The parking manager can also indicate to the parking platform assigned to the call the functionality to be applied to the call. For example, a customer can specify parking slot functionality based on ANI. For example, if the ANI for a call indicates that the call originates from a particular region, a customer may wish to play for the caller a recorded message that is targeted for that region.

The customer can also specify how call parking overflow should be handled. Call parking overflow occurs when the number of calls for which a customer has requested parking exceeds the customer's parking slot allocation. For example, the parking manager can drop a lower-revenue customer call to take a higher revenue customer call.

In one embodiment, a customer's allocation of parking slots cannot be exceeded. In another embodiment, parking requests that exceed a customer's allocation can be satisfied using available slots from the allocations of other customers. In this embodiment, such an "overflowing" call is parked on a slot allocated to another customer on a low-priority basis. If the slot is subsequently required by the allocated customer, then the low-priority call is "bumped," as explained below.

The parking manager can also apply default and alternative call treatments to calls. To ensure a call does not remain parked indefinitely, the parking manager sets a timer for each call when the call is parked. If a response from the router, instructing the parking manager to release the call to its intended destination, is not received prior to the expiration of the timer, the parking manager applies default routing to the call. This default routing, which is specified by the customer, can be to play a recorded message and terminate the call, route the call to a voicemail system, route the call to another destination specified by the customer, and the like.

Call Parking System

Before describing the present invention in detail, it is useful to describe the operation of a call parking system. FIG. 1 is a block diagram illustrating an example system architecture for a preferred embodiment of a call parking system, also referred to as a Network Park and Transfer System (NPTS). In FIG. 1, the interconnections between elements are depicted as either thick or thin lines. Thick lines depict trunks bearing call traffic, while thin lines depict data links used to implement NPTS control functions.

NPTS uses a telecommunications switch network 30 to receive calls from a call originator 28 and deliver them to a customer's call center 50. A call originator 28 represents the point of entry of a telephone call to the switch network 30. Call originator 28 may be a local exchange carrier (LEC), a caller's dedicated access line (DAL) to the switch network 30, another switch network of another carrier, or any other means for originating a call on switch network 30.

Call center 50 is typically a platform and location used by a business for customer services, operator services, telemarketing, or other such purposes. It is commonly reached with a 1-800 number, though any type of telephone number may be used. It is also common for a business to employ multiple call centers 50 for a single 1-800 number. In addition to receiving calls from the switch network 30, it may also be capable of placing outbound calls to the switch network 30 via traffic trunks.

An example of a call center 50 is illustrated in FIG. 1. This illustration is only an example of a call center architecture;

NPTS is not limited to use with this example architecture. An automated call distributor (ACD) 52 receives calls and distributes them to a plurality of agent workstations 54. In a typical call center, one agent is assigned to each agent workstation 54, although other variations are possible. The ACD 52 also queues calls when there are no available agents. The ACD 52 and agent workstations 54 may be connected via local area network (LAN) 56 or dedicated links. Also used, and typically connected to the same LAN 56, are one or more management systems 58, which are generally computer applications that manage call center resources, track usage, collect statistics, manage the workload of agents, and perform other miscellaneous functions.

In place of an ACD 52, a call center may employ a private branch exchange (PBX) or other switching device, as is well known in the industry. Also as an alternative embodiment, the functionality of the ACD/PBX 52 may be provided by the switch network 30, with the agent workstations 54 of the call center 50 being served directly from the switch network 30.

Computer/telephony interface (CTI) Server 60 is a computer that collects data from the ACD 52 and forwards it to CTI data collection server 38. This data indicates usage parameters of the ACD 52, including trunk utilization, incoming calls, queued calls, calls distributed to agent workstations 54, etc. CTI Server 60 can also pass control information to ACD 52. The CTI Server 60 is also connected to a wide area network (WAN) 26 that is used by NPTS, as described below.

A service workstation 62 is used specifically by NPTS for management of NPTS services at a customer premise 50. service workstation 62 is similar to service workstation 44, as described below.

NPTS is designed to serve a plurality of such call centers 50. NPTS can be used to serve a plurality of any call destinations, including call centers, single subscriber lines, virtual private network (VPN) stations, other switch networks, and combinations thereof, as would be apparent to one skilled in the relevant art.

Because multiple call centers are often available through a single telephone number, enhanced call routing is employed to enable the switch network 30 to route calls to any call center 50. Switch network 30 determines to which call center 50 a call should be routed. This determination can be made based on a number of factors, including time of day, day of week, point of call origination, network routing costs, and numerous other criteria. In addition, it is usually desirable to route the call to the call center with the highest current availability. The ability to route calls based on any and all of these factors, as well as the ability to park calls in the network if the intended call center is not available, is provided by NPTS.

Most telecommunications networks employ a data access point 20 to perform common call routing functions. The call routing capability of NPTS may be embodied in a data access point 20. However, in a preferred embodiment, the NPTS call routing capability is implemented as a separate component, call center router 36, to facilitate the integration of NPTS within an existing network.

When a call originator 28 sends a call to the switch network 30, a switch in the switch network 30 issues a call routing query to the data access point 20. This query is a request for a network destination to which to route the call. The data access point 20 selects a particular call routing plan for the call based on the dialed number of the call. According to standard telecommunications network technology, the data access point 20 processes the call routing query in accordance with the call routing plan, and returns to the switch network 30 a call routing translation. The translation specifies a network destination to which to route the call.

In a preferred embodiment of NPTS, call center router 36 is invoked during call routing plan execution by one or more triggers in the call routing plan. A trigger is a conditional or enforced branch in call processing, as is well known in the telecommunications art. A conditional trigger can be conditioned on the call center region, time of day, day of week, and the like. The trigger is typically placed in the call routing plan during order entry based on customer instructions.

When processing of the call routing query in the data access point 20 reaches this trigger, the call routing query is transferred to the call center router 36. The call center router 36 then processes the query and returns a call routing translation to the data access point 20. The data access point 20 in turn passes the call routing translation to the switch network 30.

A data gateway 22 serves as an interface between the data access point 20 and numerous other call routing components, including the call center router 36.

The data gateway 22 provides distribution of call routing queries to various components, as well as data translation and protocol conversion, as is well known in the art.

In addition to one or more call center routers 36, the data gateway 22 may interface the data access point 20 with a customer access point 24. This arrangement allows a customer to own and maintain call routing and control components. A customer may have components, similar in functionality to the data access point 20 or call center router 36, on the customer's premises. When the data access point 20 receives a call routing query (from the switch network 30) for a designated call, it can pass the query through the data gateway 22 to the customer access point 24. The customer may then perform call routing and control processing and return a call routing translation to the data access point 20 via the data gateway 22.

The call center router 36 is a computer that provides call routing and control functions for NPTS. It receives data on call center availability from the call centers 50 and determines, based on availability and other customer-selected criteria, to which call center 50 to route the call. It may also determine, if an intended destination is not currently available, to park the call on the switch network 30.

To determine availability of intended call center destinations, the call center router 36 uses data from a CTI data collection server 38. The CTI data collection server 38 collects data from each call center 50 via a CTI Server 60 located at each call center. The CTI Server 60 receives data from the ACD 52 that indicate such metrics as incoming calls, calls queued, calls sent to agent workstations 54, utilization of trunks serving the ACD 52, and utilization of agent workstations 54. The CTI data collection server 38 continuously receives this data from the CTI server 60 at each call center 50. Data receipt is via WAN 26.

The call center router 36 can then retrieve this data from the CTI data collection server 38 via WAN 26. Using this data, the call center router 36 can determine if the intended destination call center 50 has sufficient current availability to accept the call. Availability can be determined by total number of agent workstations, agents currently handling calls, current number of calls in queue (usually an ACD 52 queue), and rate of incoming calls.

In a preferred embodiment of the invention, a CTI data collection server 38 and CTI server 60 collect data that directly reflects agent availability. In contrast, conventional approaches measure call center 50 availability by the utilization of trunks serving the ACD 52, and the queue of the ACD 52. Thus conventional approaches do not always reflect the actual availability of agents.

NPTS uses CTI data collection components that are capable of collecting data that represent the number of active agent workstations 54 (and thus the number of agents) currently available, as well as calls in queue and trunk availability. By taking all of these data into account, the call center router 36 can determine the availability of the call center 50 more accurately than conventional approaches. Availability can also be determined using thresholds set by a customer. For example, a customer can specify that calls should be routed to a certain call center if that call center has an agent utilization rate of less than 120% (taking into account calls in queue).

If the call center router 36 determines that the intended destination call center 50 does not have sufficient current availability to accept the call, the call center router 36 can decide to park the call on the switch network 30 until the call center 50 does have sufficient availability. That is, the call is held by the switch network 30. Parking a call on the network provides the advantage of freeing the call center 50 queuing resources (i.e., ACD 52) from this particular call. This better utilizes the limited resources of call center 50. It also allows the call center 50 to serve the call later, without the caller encountering a busy signal.

NPTS also provides the advantage of centralized, network-based call parking that can be used by, and is common to, any number of call centers of different customers. The carrier that offers NPTS can use a common pool of parking resources, thus maximizing efficiency, for all of their NPTS customers. Also, a call that is parked on NPTS can be released and routed to a destination other than the one for which it was originally intended. For example, suppose a call is originally intended for call center A, but is parked because call center A was deemed unavailable. The customer that operates call center A has previously specified in the call routing plans that are used by the call center router 36 that call center B should take the call if call center A remains unavailable for more than one minute. After one minute expires, the call center router 36 specifies to a parking platform to release the call and route it to call center B. Other criteria can be employed in call rerouting decisions, as would be apparent to one skilled in the relevant art.

To park a call, the call center router 36 answers the call routing query with instructions for the switch network 30 to route the call to one of one or more parking platforms 32. A parking platform 32 is a common collection of one or more components, each of which can receive a telephone call and perform a specified application on the call. The parking platform 32 is responsible for holding the call until it can be rerouted elsewhere. NPTS can utilize many types of parking platforms. One type of component that can be used to implement parking platform 32 is generally referred to as an audio response unit (ARU), and is also known as an interactive voice response (IVR) unit. An ARU is typically a microprocessor or midrange computer that is equipped with telephony ports. An ARU is used for such applications as caller interactive menu routing services.

An parking platform can include one or more ARUs. Many telecommunication carriers today have IVR platforms and can adapt them to NPTS. ARUs can accept a call, hold it, play a voice menu for the caller, accept DTMF signals representing the caller's input, apply another treatment based on the caller's input, and ultimately release the call to the switch network 30, re-routing it to another destination.

The parking platform 32 uses a parking data gateway 34 to interface with the parking manager 42. The parking data gateway 34 provides an application programming interface (API) that performs data translation between the parking platform 32 and the parking manager 42. In this embodiment, a scalable multi-processor midrange computer, such as a DEC Alpha 1000, is used to implement parking data gateway 34.

In one embodiment, release link trunk signaling (RLTS) is used to connect parking platform 32 to switch network 30. RLTS allows a call that is parked on a parking platform to be released to the switch network 30 without the need for a second trunk. The trunk that is used by a call to reach a parking platform is released when the call is rerouted on the switch network 30, thus freeing the trunk for another call. In an alternative embodiment, the call is simply extended from the parking platform.

A parking manager 42 is responsible for managing the resources of one or more parking platforms. Parking manager 42 is a computer that interfaces with each parking platform via data links, and with the call center router 36 via WAN 26. When the call center router 36 receives a call routing query and determines that the intended call center 50 is not available, it sends a request for parking to the parking manager 42. The parking manager 42 keeps track of parking resources (ports, trunks, etc.) on each parking platform. The parking manager 42 returns to the call center router 36 a parking platform destination to which to route the call.

The call center router 36 then sends instructions back to the data access point 20 and on to the switch network 30 to route the call to the parking platform that was indicated by the parking manager 42. When the call reaches the parking platform, the parking platform sends a message to the parking manager 42 indicating that the call has been parked. The parking manager 42 then sends a similar message to call center router 36.

One advantage of NPTS is that transparent interfaces are used to permit the integration of proprietary equipment within the architecture. a generic specification of a call routing destination, called a destination label, is used to encapsulate proprietary physical parameters, such as proprietary routing addresses. The use of destination labels keeps the interfaces transparent between the call center router 36 and the data access point 20, and between the call center router 36 and the parking manager 42. When the call center router 36 answers a call routing query with a call center 50 to which to route the call, it returns a destination label to the data access point 20. This destination label indicates, in a common format and specification, the call center 50 destination. The data access point 20 then translates the destination label into a destination recognizable and useable by the switch network 30. Generally, this translation states a switch and trunk group on which to terminate the call to the call center 50, as well as digits to outpulse to the call center 50.

Also, when the call center router 36 requests a parking platform from the parking manager 42, the parking manager 42 returns a destination label to the call center router 36. This destination label indicates a specific parking platform to which to route the call. The destination label may specify a switch and trunk group through which the switch network 30 can terminate the call to the appropriate parking platform. The destination label may also specify digits to outpulse with the call to the parking platform. In one embodiment, the outpulsed digits specify one or more applications to be applied to the call by the parking platform. The call center router 36 returns this destination label to the data access point 20, which performs the routing translation.

By using destination labels, NPTS allows for the integration of different vendors' equipment into the architecture.

Different vendors' components may be used for the call center router 36 and parking manager 42 by designing them to provide a generic interface that utilizes Destination Labels.

In a preferred embodiment, the parking manager 42 includes a state engine. When a destination label is returned to the call center router 36 to route the call to a specific parking platform, a parking slot on that parking platform is placed in a "reserved" state. When the call reaches the parking platform, the parking platform notifies the parking manager 42. The parking manager 42 then places a slot on that parking platform in a "occupied" state, and notifies the call center router 36.

While the call is parked, the call center router 36 monitors the availability of the intended destination call center 50. If the call center 50 becomes available, then the call center router 36 sends a request to the parking manager 42 to unpark the call. This request also contains the destination label needed to route the call to the call center 50.

When the parking manager 42 receives a request from the call center router 36 to unpark a call, it performs a routing translation on the destination label to specify a network address. It then instructs the parking platform to release the call, providing the parking platform with the network routing address. The parking platform releases the call to the switch network 30 with the address to which to route the call. The parking manager 42 then places the slot on the parking platform in an "available" state.

Thus, even while the call is parked, NPTS continues to control the disposition of the call. The call center router 36 monitors availability at the originally intended call center 50. NPTS is also capable of releasing the call to another destination, or to a call treatment application. In one embodiment, when the parking manager 42 receives from a parking platform an indication that a call has been parked, it initiates a timer. Use of this timer, as well as its duration, can be specified by the customer. When the timer expires, if the call center router 36 has not responded to the parking manager 42 with a request to unpark the call, the parking manager 42 instructs the parking platform to release the call and route it to a voicemail treatment 46. The voicemail treatment 46 plays a message to the caller. The caller can then leave a voicemail message for the customer. Alternatively, other call treatment applications 48 may be used. The parking manager 42 simply sends the appropriate network routing address to the parking platform. The parking platform then releases the call to the switch network 30, and the switch network 30 routes the call to voicemail treatment 46 or other call treatment 48.

The voicemail treatment 46 and other call treatments 48 are also connected to WAN 26. Thus, when they receive a call, they send a notification to the parking manager 42 to confirm the call has been received and properly treated.

A service workstation 44 is used for integrated order entry and provisioning of the NPTS system. Specifications of certain parameters may be entered using service workstation 44. These parameters can include IVR routing algorithms (time of day, day of week, etc.), call routing destinations (call centers, other stations), availability measurement thresholds, call treatment applications, parking manager timer use and duration, and numerous other parameters. In addition, a service workstation 62 can be placed at a customer's premises, allowing a customer to order and manage their own services in a similar fashion.

Orders entered via workstations 44 and 62 are received by call center data manager (CCDM) 70. CCDM 70 includes a data base for storing customer orders. Based on customer orders, CCDM 70 provides provisioning information to parking manager 42. The provisioning information contains customer order information based on the customer orders.

In a preferred embodiment of NPTS, a WAN 26 provides connectivity among the various components that control the disposition and routing of a call.

These components include the data gateway 22, call center router 36, parking manager 42, CTI data collection server 38, voicemail treatment 46 and other call treatments 48, service workstation 44, customer premise service workstation 62, and call centers 50. This arrangement allows for easy incorporation of additional components into the NPTS architecture, and provides the connectivity needed for data communications among the various components.

Figure 2:
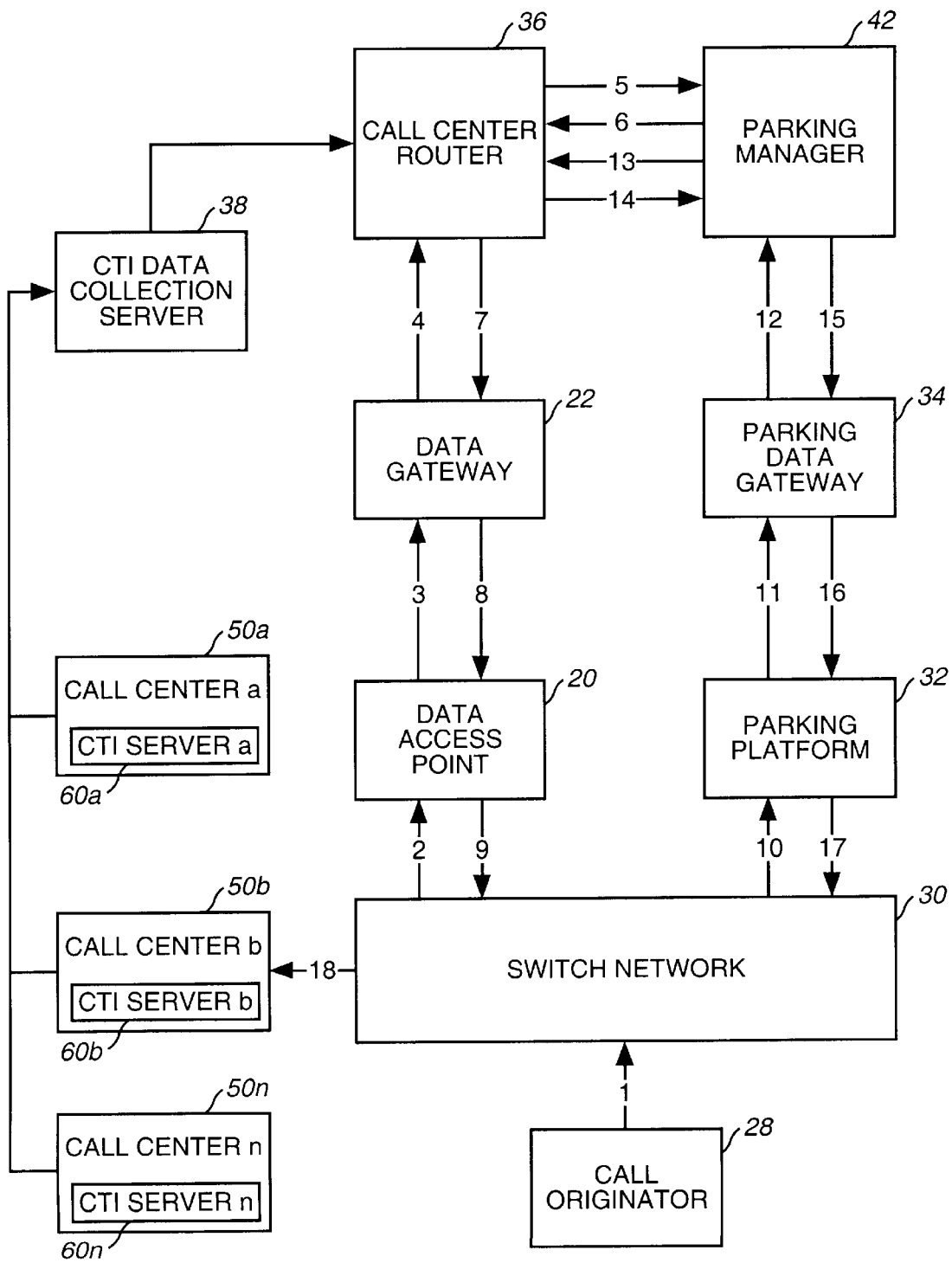
FIG. 2 is a flow diagram illustrating a process performed by the call parking system.

FIG. 2 is a flow diagram illustrating a process performed by a preferred embodiment of NPTS. Shown is the architecture of FIG. 1, along with call and data flows among the various components. The process shown is that of NPTS receiving a call for one 50b of multiple call centers 50a–50n, determining the intended call center 50b is unavailable, parking the call on the parking platform 32, later determining the intended call center 50b has become available, releasing 20 the call from parking platform 32, and routing the call to the intended call center 50b.

1. The switch network 30 receives a call from a call originator 28 over a traffic trunk. The dialed number of the call is one designated for a call center 50 that subscribes to NPTS.
2. a switch from the switch network 30 issues a call routing query to the data access point 20 over a data link.
3. The data access point 20 invokes the appropriate call routing plan, based on the dialed number of the call. During the processing of this plan, a trigger is reached that causes the data access point 20 to transfer the call routing query to a call center router 36 via data gateway 22.
4. The data gateway 22 routes the call routing query to the appropriate call center router 36, based on the dialed number translation.
5. The call center router 36 calls invokes the appropriate call routing plan, based on the dialed number, ANI, and any other customer-specified parameters that may be used in intelligent call routing algorithms. The call center router 36 determines that the call should be routed to call center 50b. The call center router 36 then determines that the intended call center 50b is currently not available. Therefore, the call center router 36 sends a parking request to the parking manager 42.
6. In response to the parking request, the parking manager 42 determines which parking platform 32 is available to park the call. In this case, parking manager 42 selects parking platform 32 is available, and returns to the call center router 36 a destination label that indicates the selected parking platform 32. The parking manager 42 then reserves a parking slot on the selected parking platform 32.
7. The call center router 36 sends the destination label to the data gateway 22.
8. The data gateway 22 sends the destination label to the data access point 20.
9. The data access point 20 translates the destination label to a physical network routing address. The data access point 20 sends this address in a response message to the switch in the switch network 30 that issued the original call routing query in step 2.
10. The switch network 30 routes the call to the parking platform 32. The switch network 30 uses a RLT to reach the selected parking platform 32. It outpulses digits along with the call to the selected parking platform 32, which uses these digits to perform one or more applications on the call.

11. The selected parking platform 32 sends a message to the parking data gateway 34 to notify parking manager 42 that the call has been received.
12. The parking data gateway 34 forwards the message to parking manager 42.
13. The parking manager 42 places the slot on the selected parking platform 32 that received the call in a "occupied" status, so that the slot will not be considered for use in parking another call until it is made available. The parking manager 42 then sends a message to the call center router 36 to announce that the call has been parked. The parking manager 42 may also initiate a timer, the expiration of which triggers the release of the call to voicemail treatment 46 or other call treatment 48.
14. The call center router 36 continuously monitors availability of the intended call center 50b. When the call center 50b becomes available, the call center router 36 sends an unpark request, along with the destination label of the call center 50b, to the parking manager 42.
15. The parking manager 42 translates the destination label to a physical network routing address. The parking manager 42 sends a message to parking data gateway 34 to instruct the selected parking platform 32 to release the call and route it to the call center 50b. The parking manager 42 also places the parking slot on the selected parking platform 32 in an "available" state.
16. The parking data gateway 34 forwards the message to the selected parking platform 32.
17. The selected parking platform 32 releases the call to the switch network 30. The RLT that was used by the call to reach the selected parking platform 32 from the switch network 30 is now available for another call.
18. The switch network 30 routes the call to the call center 50 b.

Figure 3:
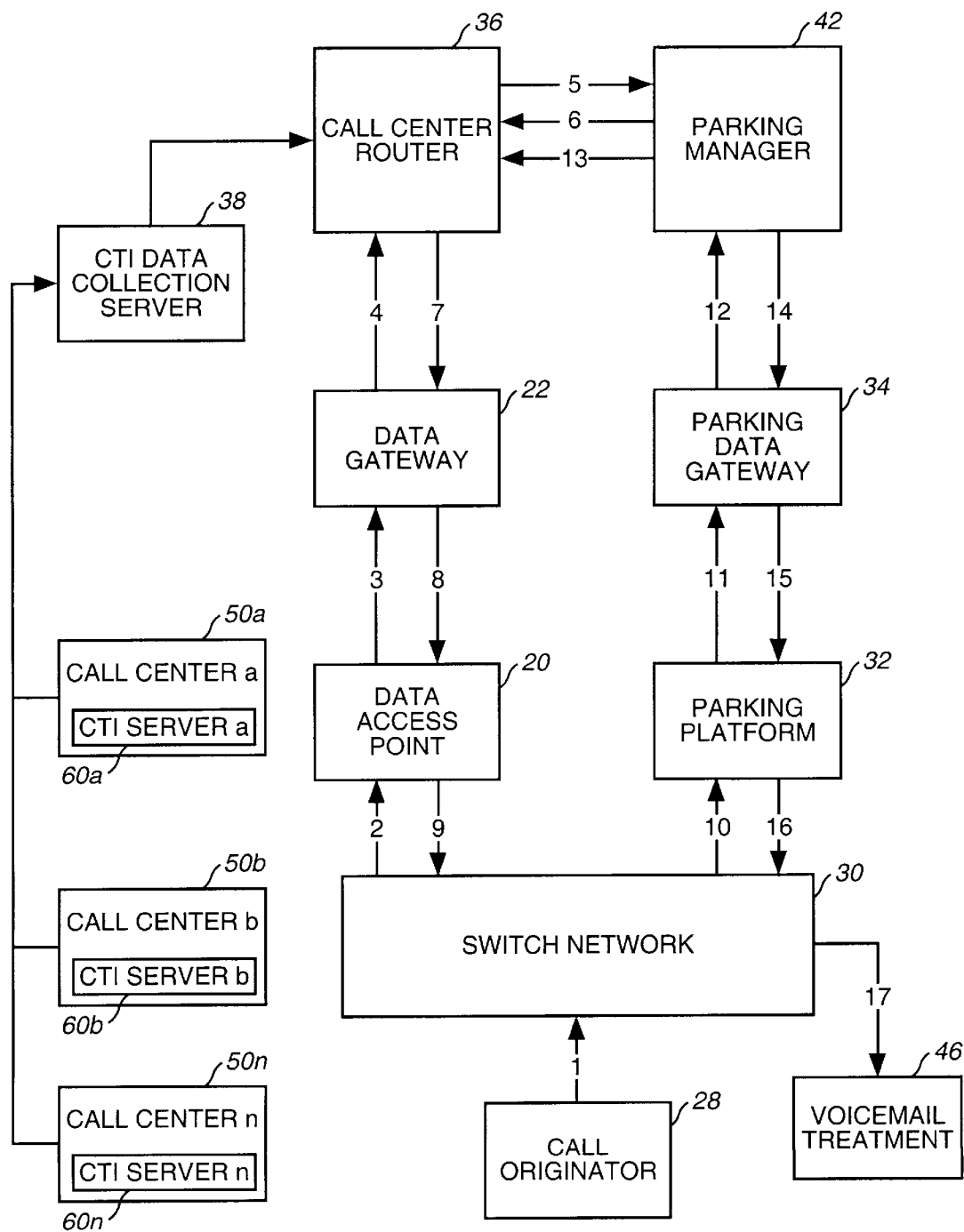
FIG. 3 is another flow diagram illustrating a process performed by the call parking system.

FIG. 3 is another flow diagram illustrating a process performed by a preferred embodiment of NPTS. The process shown is that of NPTS receiving a call for one 50b of multiple call centers 50a–50n, determining that the intended call center 50b is unavailable, and parking the call on a parking platform 32. However, before the intended call center 50b becomes available, a timer on the parking manager 42 expires. This triggers the release of the call to a voicemail call treatment 46.

1. The switch network 30 receives a call from a call originator 28 over a traffic trunk. The dialed number of the call is one designated for a call center 50 that subscribes to NPTS.
2. a switch from the switch network 30 issues a call routing query to the data access point 20 over a data link.
3. The data access point 20 calls on the appropriate call routing plan, based on the dialed number of the call. During the processing of the call routing plan, a trigger is reached that causes the data access point 20 to transfer the query to a call center router 36 via data gateway 22.
4. The data gateway 22 routes the query to the appropriate call center router 36 based on the dialed number translation.
5. The call center router 36 invokes the appropriate call routing plan, based on the dialed number, ANI, and any other customer-specified parameters that may be used in intelligent call routing algorithms. The call center router 36 determines that the call should be routed to call center 50b. The call center router 36 then determines that the intended call center 50b is currently not available.

Therefore, the call center router 36 sends a parking request to the parking manager 42.
6. In response to the parking request, the parking manager 42 determines which parking platform 32 is available to park the call. In this case, parking manager 42 selects parking platform 32 is available, and returns to the call center router 36 a destination label that indicates the selected parking platform 32. The parking manager 42 then reserves a parking slot on the selected parking platform 32.
7. The call center router 36 sends the destination label to the data gateway 22.
8. The data gateway 22 sends the destination label to the data access point 20.
9. The data access point 20 translates the destination label to a physical network routing address. The data access point 20 sends this address in a response message to the switch in the switch network 30 that issued the original call routing query in step 2.
10. The switch network 30 routes the call to the selected parking platform 32. The switch network 30 uses a RLT to reach the selected parking platform 32. It outpulses digits along with the call to the parking platform 32, which uses these digits to perform one or more applications on the call.
11. The selected parking platform 32 sends a message to the parking data gateway 34 to notify the parking manager 42 that the call has been received.
12. The parking data gateway 34 forwards the message to the parking manager 42.
13. The parking manager 42 places the slot on the selected parking platform 32 that received the call in a "occupied" status, so that the slot will not be considered for use in parking another call until it is made available. The parking manager 42 then sends a message to the call center router 36 to announce that the call has been parked. The parking manager 42 also initiates a timer, the expiration of which triggers the release of the call to voicemail treatment 46.
14. The call center router 36 continuously monitors availability of the intended call center 50b. However, prior to receiving an unpark request from the call center router 36, the timer that was set by the parking manager 42 when the call was parked expires. The parking manager 42 sends instructions to the parking data gateway 34 to instruct the selected parking platform 32 to release the call. Along with these instructions, the parking manager 42 sends the physical network routing address for the voicemail treatment 46.
15. The parking data gateway 34 forwards the message to selected parking platform 32.
16. The selected parking platform 32 releases the call to the switch network 30. The RLT that was used by the call to reach the selected parking platform 32 from the switch network 30 is now available for another call.
17. The switch network 30 routes the call to voicemail treatment 46. The caller may then leave a voicemail message for the customer.

The processes illustrated in FIGS. 2 and 3 are examples of the use of NPTS. NPTS can perform other processes, as would be apparent to one skilled in the relevant art. For example, the parking request can originate at the IVR. For another example, other call treatment applications 48 may be used rather than voicemail treatment 46. In one embodiment, call treatments can be applied to the call by a parking platform while the call is parked.

Of course, NPTS can route calls directly to call centers 50, or other destinations, without parking the calls, if availability is sufficient at the intended destination. NPTS can also park a call, and then releasing it to be routed to a call center 50 other than the originally intended call center 50.

An Example Environment

Figure 4:
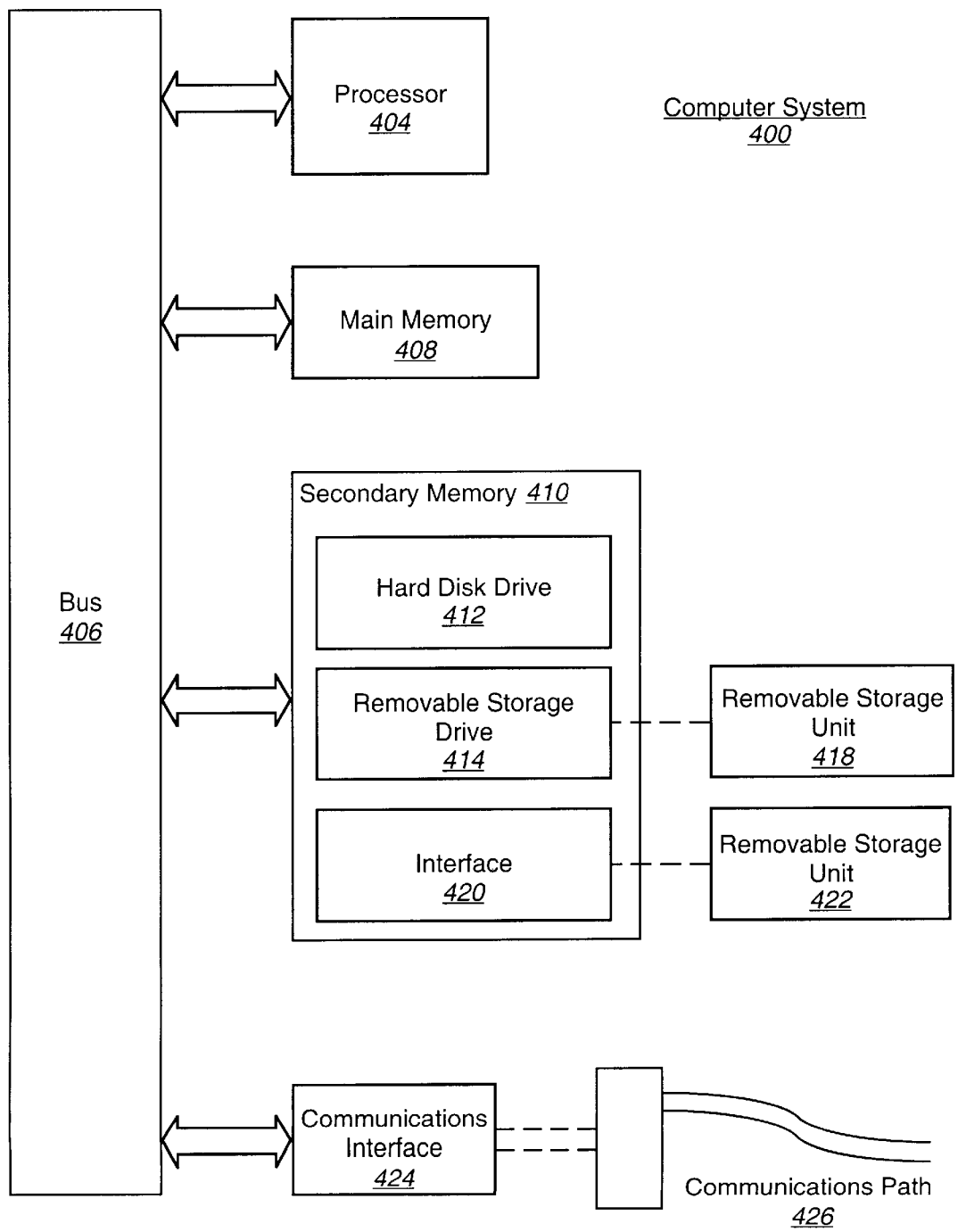
FIG. 4 is a block diagram illustrating an example environment in which the present invention can operate.

Before describing the operation of the present invention in detail, it is useful to first describe an exemplary environment in which the present invention can operate. FIG. 4 is a block diagram illustrating such an example environment. Computer system 400 includes one or more processors, such as processor 404. The processor 404 is connected to a communications bus 406. Various embodiments are described in terms of this example computer system. After reading this description, it will be apparent to a person skilled in the relevant art how to implement the present invention using other tables, and the like, and various combinations thereof.

Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 also includes a communications interface 424. Communications interface 424 allows software and data to be transferred between computer system 400 and external devices through communications path 426. Examples of communications interface 424 can include a modem, a network interface (such as an Ethernet card), a communications port, etc. Software and data transferred through communications interface 424 are in the form of signals which can be electronic, electromagnetic, optical or other signals capable of being received by communications interface 424 through communications path 426.

The present invention is described in terms of this example environment. Description in these terms is provided for convenience only. It is not intended that the present invention be limited to application in this example environment. In fact, after reading the following description, it will become apparent to a person skilled in the relevant art how to implement the present invention in alternative environments.

Parking Manager

The following discussion describes in detail an example implementation of parking manager 42, according to a preferred embodiment of the present invention. In this discussion, a "customer" is the owner of a particular 800 number which is to be serviced by the parking manager 42. A "caller" is the originator of a call. A "parking platform" 32 refers to a group of parking ports that can be reached with a common switch trunk group. Also, the use of an 800 number is referenced only for exemplary purposes. The present invention can be employed with any type of telephone number, as would be apparent to one skilled in the relevant art.

In a preferred embodiment, a parking platform 32 is an ARU, or group of ARUs, that is sectioned into groups of parking ports. This can be done to distinguish ports with different functionalities. Alternatively, a single ARU, or group of ARUs, may not be sectioned into groups of ports and may represent an entire, singular parking platform 32. The present invention can be employed with other types of parking platforms, as would be apparent to one skilled in the relevant art.

In one embodiment, multiple parking managers 42 are employed in a hot-cutover system for redundancy. In this embodiment, one parking manager 42 is designated primary and the other parking managers 42 are designated backup. Important data, such as call state data store 88, parking slot usage data store 82, and parking slot resource data store 84, are regularly replicated from the primary parking manager 42 to the backup parking managers 42. If the primary parking manager 42 fails, a backup parking manager 42 can take over immediately.

Figure 5:
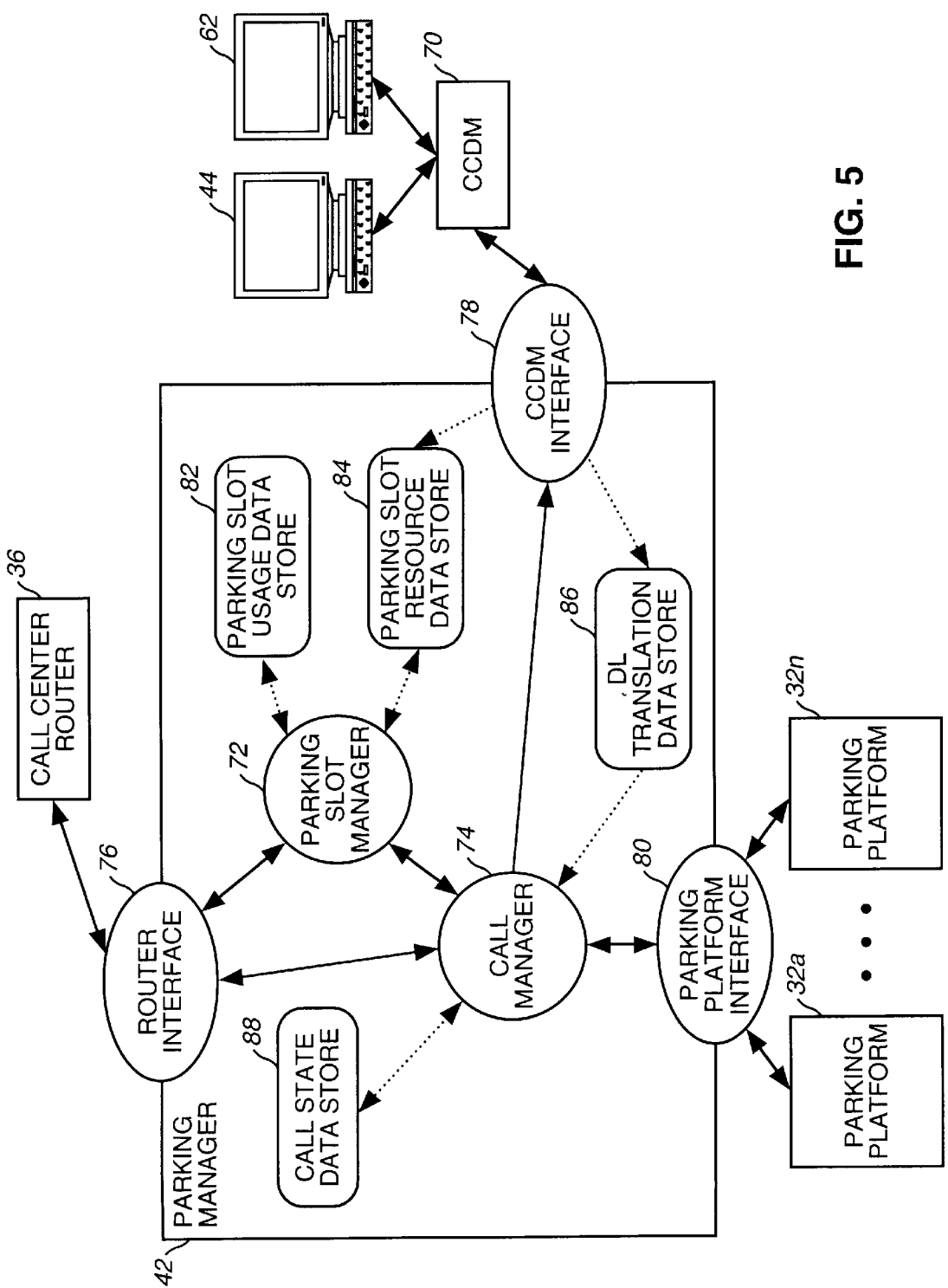
FIG. 5 illustrates an example architecture for a parking manager according to a preferred embodiment.

FIG. 5 illustrates an example architecture for a parking manager 42 according to a preferred embodiment. The parking manager 42 is shown in context with a call center router 36, parking platforms 32, and call center data manager (CCDM) 70.

In a preferred embodiment, the parking manager 42 includes two primary components: a parking slot manager 72 and a call manager 74. The parking manager 42 also includes components that serve as interfaces to external systems. These interface components are primarily communications managers that support the particular type of data communications links used by the parking manager 42 to communicate with external systems. A router interface 76 manages the interface to the call center router 36. A CCDM interface 78 manages the interface to the CCDM 70. A parking platform interface 80 is provided for the parking platforms 32.

Parking slot manager 72 manages the resources of the parking platforms 32, including total slots, available slots, used slots, and slots allocated to customers. In response to call parking requests from the call center router 36, parking slot manager 72 assigns the call to a parking platform 32.

Parking slot manager 72 uses a data set referred to as parking slot usage data store 82 to store and maintain parking slot status for each parking platform 32. Parking slot usage data store 82 tracks the total number of slots, the number of available slots, and the number of slots in use on each parking platform 32. When parking slot manager 72 assigns a call to a particular parking platform 32, it modifies the parking slot usage data store 82 by decrementing the number of available slots for that parking platform 32. If the number of available slots on a platform is zero (or equivalently, the number of slots in use equals the total number of slots), parking slot manager 72 will not assign the call to that particular parking platform 32. Parking slot usage data store 82 also includes the DL for each parking platform 32.

Parking slot manager 72 uses another data set referred to as parking slot resource data store 84 to store and maintain the allocation of parking slots to specific customers. Parking slot resource data store 84 tracks the number of slots allocated to each customer based on the customer's order. Customer orders are entered via workstations 44 and 62, provisioning information based on the customer orders is fed to the parking manager 42 by CCDM 70 via CCDM interface 78. The customer order information is thus entered into the parking slot resource data store 84.

In a preferred embodiment, a customer order includes a customer identifier, including an identification code and an 800 number, along with the number of requested slots. a customer order can also specify the functionality required of the requested parking slots, such as voice recognition or a particular recorded message to be played. This data is tracked by parking slot resource data store 84. In a preferred embodiment, slots are not assigned to customers in advance, but rather are assigned on demand. For example, if a network has 1000 voice recognition slots, and 6 customers each request 100 slots, the total 600 slots needed are allocated over the entire 1000 slots available, with no particular slot assigned to a specific customer. Thus, in one embodiment, the entire group of 1000 slots can be made available to a single customer in the event of high traffic volumes and/or overflow.

When parking slot manager 72 receives a request for call parking, and the customer for the call has not specified any particular functionality in its customer order, parking slot manager 72 queries parking slot usage data store 82 to find an available slot. Parking slot manager 72 then selects a slot on a parking platform 32, decrements the available slot counter for the selected parking platform, identifies the DL that will route a call to the selected parking platform, and specifies this DL in its response to the call center router 36.

Parking slot resource data store 84 contains data describing the requirements for each 800 number specified by a customer in a customer order. a single customer may have multiple 800 numbers. Each 800 number has a separate entry in parking slot resource data store 84. For each customer, this data includes a customer identifier, 800 number, number of slots allocated, default routing, and the maximum parking time. In a preferred embodiment, all parking slots have the same functionality, so the number of slots allocated is a generic allocation across all parking platforms 32. In on alternative embodiment, parking slots have differing functionalities, so the number of slots allocated is a specific allocation across parking platforms 32 with specific functionality.

For example, a customer order may specify parking for two 800 numbers. For its first 800 number, it specifies 100 parking slots with no specific functionality, a 60 second parking timer, and default routing to a voicemail system. For its second 800 number, it specifies 30 parking slots with voice-recognition recognition, a 30 second timer, a specific application that features menu routing and voice input, and default routing to one of three different destination numbers depending on a caller's selection from the application menu.

The other primary component of the parking manager 42 is the call manager 74. Call manager 74 manages each call to be parked throughout the "life" of the call, throughout the entire call parking system. When parking slot manager 72 routes a call to a particular parking platform 32, it notifies call manager 74 of the event. In response, call manager 74 creates an instance of the call in a temporary data store referred to as call state data store 88. The call instance is a logical construct that stores and maintains the status of the call to be parked. When the call has been parked at the selected parking platform, call manager 74 notes the event.

When a destination for a parked call becomes available, call center router 36 sends a notification message to parking manager 42. The message contains the DL for the available destination. Call manager 74 uses a data set referred to as DL/Termination Address Translation Data ("DL translation data") 86 to translate the DL to one or more physical network routing addresses. DL translation data 86 stores and maintains data to translate a DL to one or more physical network routing addresses. If a DL specifies more than one routing address, call manager 74 resolves the DL to a single destination based on predetermined criteria or methods, including time of day or day of week, load balancing, round robin, or a random generator.

Call manager 74 then sends the physical network address of the call destination to the parking platform 32 where the call is parked, and instructs that parking platform 32 release the call. In response, parking platform 32 releases the parked call to the switch network 30 and routes the call to that call destination.

Figure 6A:
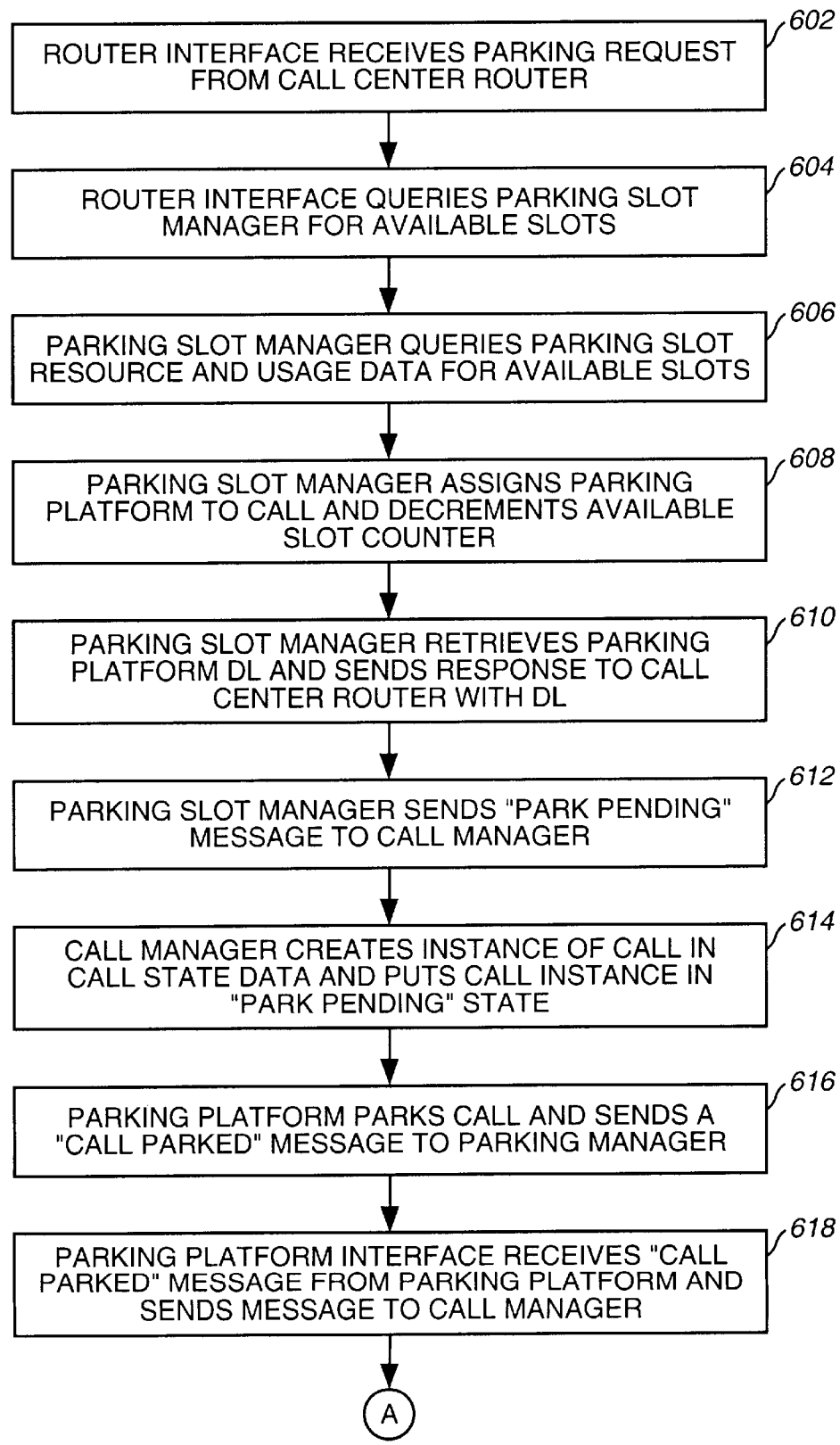
FIGS. 6A, 6B, and 6C are flowcharts illustrating an example process performed by a parking manager in processing a single call according to a preferred embodiment.
Figure 6B:
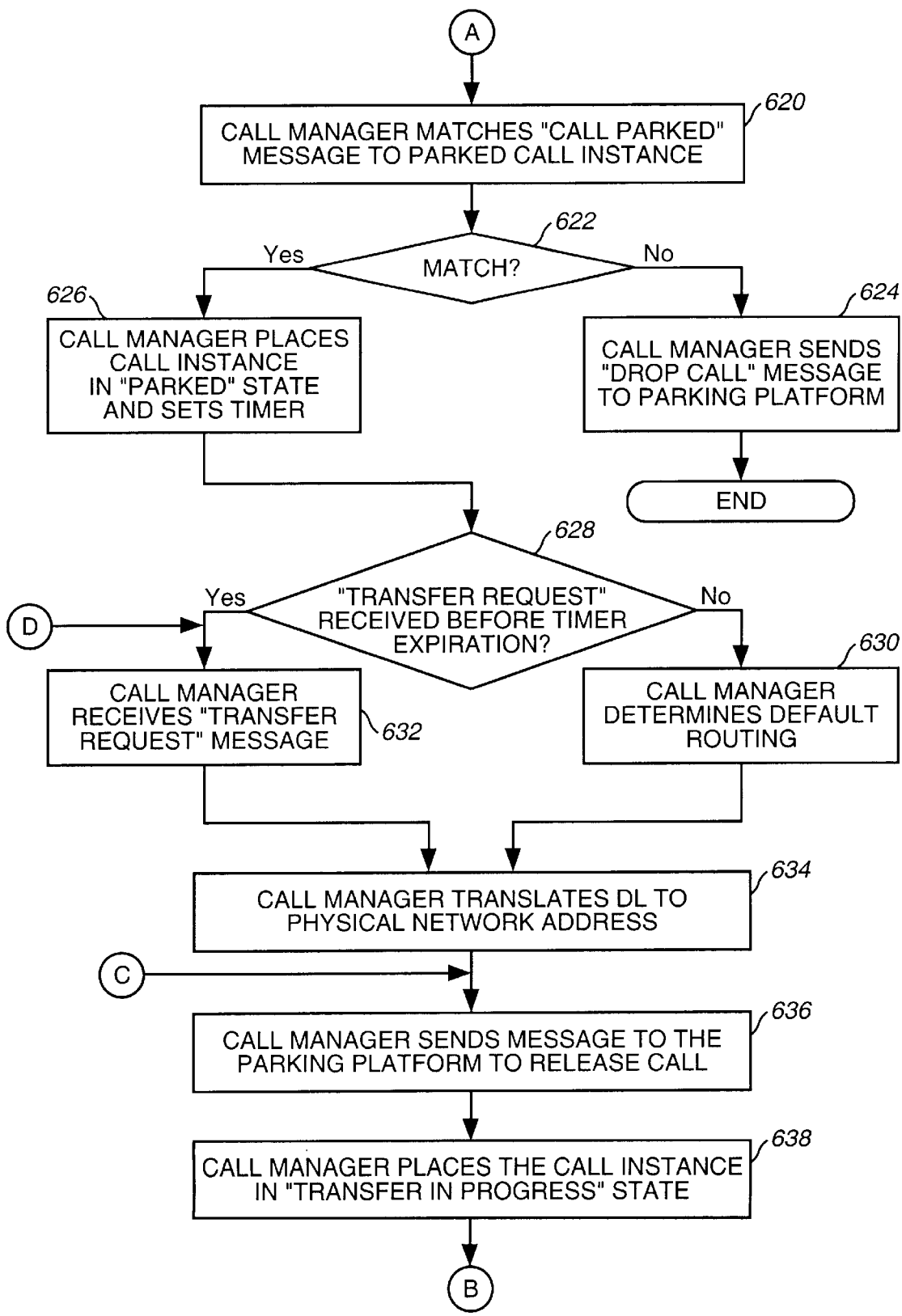
Figure 6C:
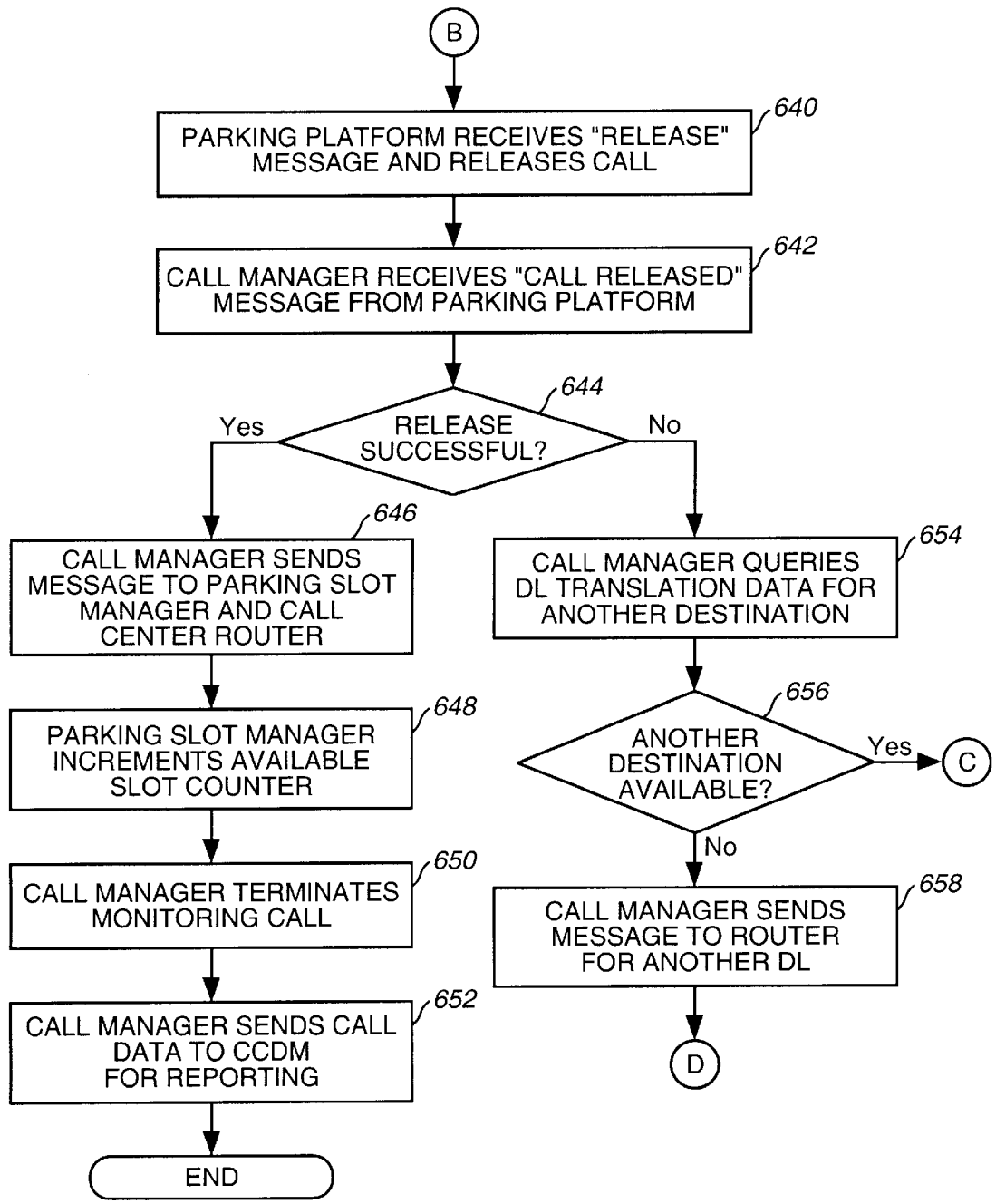

FIGS. 6A, 6B, and 6C are flowcharts illustrating an example process performed by the parking manager 42 in processing a single call according to a preferred embodiment.

Processing begins when the call center router 36 sends a parking request (that is, a request to park the call) to the parking manager 42, as described with respect to step 5 of FIGS. 2 and 3. Referring to FIG. 6A, the router interface 76 receives the parking request from the call center router 36, as shown in a step 602.

In a preferred embodiment, the request message includes the ANI of the caller, the dialed (800) number, and a customer identifier that identifies the owner of the dialed number. The router interface 76 queries parking slot manager 72 for available slots, as shown in a step 604.

Parking slot manager 72 examines parking resources to find an available slot to assign to the call, as shown in a step 606. In one embodiment, parking slot manager 72 first queries parking slot resource data store 84 to determine which slots, and how many, are allocated to the customer. Parking slot manager 72 also determines whether any call treatments, such as a recorded message, are to be applied by the parking platform 32. Parking slot manager 72 then queries parking slot usage data store 82 to determine whether any parking slots are available. If a particular parking slot functionality is required, only parking platforms supporting that functionality are examined. Otherwise, all parking platforms 32 are examined for available slots.

If an available slot is found, parking slot manager 72 assigns the call to the parking platform for the parking slot. In one embodiment, if no parking slots are available, the parking request is rejected. The parking platform then sends a message to the call center router informing the router that the parking request has been rejected.

In an alternative embodiment, parking slot manager 72 can assign the call to a slot not allocated to the customer. The following example is directed to an embodiment where parking slots support differing functionality. If the customer requested slots supporting parking functionality only, but only voice-recognition slots are available, the call can be assigned to one of the voice-recognition slots. When a call is assigned to a slot not allocated to the customer, the call is assigned to that slot on a low-priority basis. Then, if a call must be parked for a customer who is allocated voice-recognition slots, the parked call can be "bumped." In a preferred embodiment, a call is bumped by releasing it to a live operator service. Other methods of bumping a call can be employed without departing from the spirit and scope of the present invention, as would be apparent to one skilled in the relevant art. In one embodiment, only a predetermined percentage of slots having specific functionality are allocated to calls not requiring that functionality.

In an alternative embodiment, parking slot manager 72 first queries parking slot usage data store 82 to determine whether any slots are available. If so, parking slot manager 72 assigns the call to one of the available slots. If not, parking slot manager 72 queries parking slot resource data store 84 to determine whether the customer has requested specific functionality for that call. If so, then parking slot manager 72 queries parking slot usage data store 82 to determine whether a low-priority call is parked on a slot with that functionality, and therefore can be bumped.

One of the above methods, or any similar method, can be used to find a parking platform 32 having an available parking slot for a customer, as would be apparent to one skilled in the relevant art. If more than one parking platform 32 with one or more available slots are found, then a load balancing technique or a round robin technique may be used to select a single parking platform 32.

When parking slot manager 72 finds an available slot on a parking platform 32, it assigns the call to that parking platform 32 by decrementing the available slot counter for that parking platform 32, as shown in a step 608. Parking slot manager 72 retrieves the DL for the assigned parking platform 32. This DL states, directly or indirectly through pending translation, the switch and trunk group that terminates to the assigned parking platform 32. Parking slot manager 72 then sends a response message, via the router interface 76, to the call center router 36, as shown in a step 610. The response message specifies the DL for the assigned parking platform 32.

Parking slot manager 72 also sends a "park pending" message to call manager 74 indicating that a call is being routed to a particular parking platform 32, as shown in a step 612. In a preferred embodiment, this message identifies the call by the dialed number and ANI, and identifies the parking platform 32. The message may also specify any application that the parking platform 32 will apply to the call, default routing, and value of the parking timer to be set. This information is obtained by parking slot manager 72 from parking slot resource data store 84.

In response, call manager 74 creates an instance of the call in call state data store 88 and places the call instance in a "park pending" state, as shown in a step 614. Call manager 74 now expects a message from a parking platform 32 that the call has been parked. If no such message is received (for example, because the caller has hung up), call manager 74 terminates monitoring the call.

When the assigned parking platform 32 receives the call to be parked, it parks the call and sends a "call parked" message to the parking manager 42 indicating that the call has been parked, as shown in a step 616. In a preferred embodiment, a call is parked by connecting the call through the switch network 30 from the point of call origination to a port on an ARU of the assigned parking platform 32. Other methods of parking the call are within the spirit and scope of the present invention, as would be apparent to one skilled in the relevant art. When the call has been successfully parked, the parking platform 32 sends a "call parked" message to call manager 74.

The "call parked" message is received by the parking platform interface 80, which sends the message to call manager 74, as shown in a step 618. In a preferred embodiment, this message contains the dialed number and the ANI of the caller. Call manager 74 uses this data to match the call to its associated call instance in call state data store 88, as shown in a step 620 in FIG. 6B.

In addition to identifying the associated call instance for further processing, this matching procedure serves another function. If the switch network 30 erroneously routes a call for which parking has not been requested to a parking platform 32, the parking manager 42 can instruct the parking platform 32 to drop the call. Since the parking manager 42 never received a parking request from the call center router 36, the call should not be parked. Thus, if a match to a call instance in the call state data store 88 cannot be made, call manager 74 returns a "drop call" message to the parking platforms 32, instructing the parking platform 32 to terminate the call, as shown in a step 624.

If the match is made, call manager 74 places the call instance in a "parked" state and sets a parking timer for the call, as shown in a step 626. Any timer value can be employed without departing from the spirit and scope of the present invention, as would be apparent to one skilled in the relevant art.

Call manager 74 now expects to receive from the call center router 36 a "transfer request" message instructing the parking manager 42 to release the call and route it to a DL included in the message. Call center router 36 returns a DL for the chosen call destination in a "transfer request" message to parking manager 42. In nominal processing, this message is received prior to the expiration of the parking timer.

If the timer expires prior to receiving the "transfer request" message from the call center router 36, then call manager 74 determines default routing, as shown in a step 630. Default routing designation is found in the call instance, and was originally obtained from parking slot resource data store 84 or from call center router 36. Default routing contains a DL, which call manager 74 translates to a physical network address. Default routing can include any treatment prescribed by the customer. Example call treatments include playing a recorded message at the parking platform 32 and terminating the call, sending the call to another platform which will play a recorded message, sending the call to a voicemail system, playing another menu application for the caller, sending the call to an operator, and sending the call to any other destination. Thus, the use of a timer and default routing ensures that a call will not be parked for an indefinite duration.

However, if the "transfer request" message from the call center router 36 is received before the timer expires, the parked call will be released and routed to the termination specified by a DL included in the message. The parking manager 42 receives the "transfer request" message from the call center router 36 via router interface 76, and forwards the message to call manager 74, as shown in a step 632. In a preferred embodiment, the message includes the dialed 800 number and ANI, along with the DL for the call destination. The specified call destination can be the destination originally dialed by the caller, or an alternative destination specified by the customer, as would be apparent to one skilled in the relevant art. In one embodiment, the ANI of the call is used to identify the call and match it to the call instance. In another embodiment, a network call tag is used. Other methods can be used to match the call to its instance without departing from the spirit and scope of the present invention, as would be apparent to one skilled in the relevant art.

Call manager 74 queries DL translation data 86 to resolve the DL to a physical network address, as shown in a step 634. Call manager 74 then sends a "release" message to the parking platform 32 to release the call and transfer it to the translated address, as shown in a step 636. The DL is either the DL obtained from the call center router 36 in step 632 or the DL obtained from default routing in step 630. Call manager 74 then places the call instance in a "transfer in progress" state, as shown in a step 638. Call manager 74 now expects a response message from the parking platform 32 indicating that the call has been released.

The parking platform 32 receives the "release" from the parking manager 42, and releases the call to the switch network 30, as shown in a step 640 in FIG. 6C. Parking platform 32 then sends a "call released" message to the parking manager 42. Call manager 74 receives, via the parking platform interface 80, the "call released" message from the parking platform 32, as shown in a step 642.

If this message indicates that the call was successfully released, call manager 74 sends a message to both the parking slot manager 72 and the call center router 36, as shown in a step 646. This message indicates that the parked call has been successfully released and therefore call parking has terminated. In response, parking slot manager 72 increments the available slot counter for the parking platform 32, and call manager 74 deletes the call instance from call state data store 88, as shown in steps 648 and 650, respectively.

The parking manager 42 can provide data to the CCDM 70 for reporting purposes. This data can include, for example, the number of calls parked, abandoned, dropped, released, default routed, etc. This data can also include the amount of time the call was parked, the parking platform 32 on which the call was parked, any application treatment performed for the call, and the destination to which the call was released. Reports on such data can be used by a customer to manage their call center. For example, if a report indicates that a large number of calls are being parked, the customer may decide to add capacity to their call center. Reports can also be used by the operator of the call parking system to analyze network use, plan network capacity, plan parking resource capacity, etc. For example, if a customer determines that, due to high call volume and the resulting long parking times, callers are hanging up while being parked, the customer may elect to disable call parking temporarily. This is accomplished simply by notifying the parking manager to disable call parking for the customer or for one or more 800 numbers.

The reporting data can be provided to the CCDM 70, which formats the reports. The data can also be provided to customer workstations to drive real-time monitoring and reporting of customer call activity.

In one embodiment, a DL can specify more that one address. If the "call released" message received from the parking platform 32 indicates that the call was not successfully released, then call manager 74 queries DL translation data 86 for another destination, as shown in a step 654. As stated previously, more than one actual physical network destination may be specified for a single DL. If so, then call manager 74 selects the next destination corresponding to the DL and sends the address of that destination to the parking platform 32, as shown in a step 636. The example process then proceeds as described above.

If there is no other destination for the DL, then call manager 74 sends a message to the call center router 36 to request another DL, as shown in a step 658. If call center router 36 supports intelligent call routing, then it determines another destination, and sends another "transfer request" message with the new DL to the parking manager 42. The example process then proceeds with step 632, as described above. In an alternative embodiment, the call can be released to a live operator.

In an alternative embodiment, a DL specifies one address. In this embodiment, then, steps 654 and 656 are omitted.

Conclusion

The parking manager 42 can be used as a resource manager in any call parking system. Such a system can be used to offer call parking for customer call centers, so that a customer can reduce or even eliminate the need for such resources at their premises.

By placing the parking manager 42 in the NPTS architecture shown in FIG. 1, the resources of one or multiple parking platforms 32 can be used in the most efficient manner. Also, an increased level of functionality is provided to customers by allowing them to specify how the call will be handled when a customer termination is not available. As described above, customers can specify default routing, use and value of a timer, functionality of parking slots, applications and messages to play for callers, and the like.

A key feature of the present invention is that the modularization of its components creates an open architecture that is easily adaptable to many contexts. For example, the modularization of DL translation data allows the customer to use any format for network routing addresses, and to accommodate many different types of destinations. As a further example, the segregation of parking slot usage data store 82 and parking slot resource data store 84 allows allocation of slots to customers in many different ways, and provides for maximum efficiency of slot usage. The segregation of parking slot manager 72 and call manager 74 also allows a parked call to be controlled by the parking manager 42 throughout the entire duration of the call, independently of incoming calls. This arrangement also minimizes the real-time impact to the call center router 36. Parking request messages from, and responses to, the call center router 36 are more time-critical than call state management. Parking slot manager 72 can be dedicated to serving the call center router 36 while call manager 74 manages individual calls.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described example embodiments, but should be defined only in accordance with the following claims and their equivalents.

What is claimed is:

1. A system for parking a telephone call at a parking platform in a telecommunications switch network, the call made to a call destination for a customer, resulting in a parked call, comprising:

means for receiving a parking request to park a call made to the call destination for the customer;

means for assigning the parking platform to the call based on a customer order, the customer order specifying parking requirements of the customer;

means for sending a reply to an originator of the parking request, the reply identifying the parking platform;

means for receiving a routing request to route the parked call to an alternate call destination, the routing request identifying the alternate call destination;

means for directing the parking platform to release the parked call and route the parked call to the alternate call destination;

means for monitoring the status of calls associated with call parking requests; and means for collecting call parking data for the customer, the call parking data describing at least one of the number of calls parked, number of calls abandoned, number of calls dropped, number of calls released, number of calls default routed, and the destination for which calls are parked.

2. The system of claim 1, further comprising:

means for receiving a routing request to route the parked call to the call destination, the routing request identifying the call destination; and means for directing the parking platform to release the parked call and route the parked call to the call destination.

3. The system of claim 1, further comprising:

means for allocating a predetermined number of parking slots to the customer based on the customer order.

4. The system of claim 3, further comprising:

means for specifying a call treatment application to be applied to calls for the customer parked on at least a portion of the parking slots allocated to the customer.

5. The system of claim 1, further comprising:

means for reporting at least a portion of the collected call parking data to the customer.

6. The system of claim 1, wherein the means for assigning comprises:

means for assigning the parking platform to the call based on the availability of parking slots for the parking platform.

7. A method for parking a telephone call at a parking platform in a telecommunications switch network, the call made to a call destination for a customer resulting in a parked call, the method comprising the steps of:

receiving a parking request to park a call made to the call destination for the customer;

assigning the parking platform to the call based on a customer order, the customer order specifying the parking requirements of the customer;

sending a reply to an originator of the parking request, the reply identifying the parking platform;

receiving a routing request to route the parked call to an alternate call destination, the routing request identifying the alternate call destination;

directing the parking platform to release the parked call and route the parked call to the alternate call destination;

monitoring the status of calls associated with call parking requests; and collecting call parking data for the customers, the call parking data describing at least one of the number of calls parked, number of calls abandoned, number of calls dropped, number of calls released, number of calls default routed, and the duration for which calls are parked.

8. The method of claim 7, further comprising the steps of:

receiving a routing request to route the parked call to the call destination, the routing request identifying the call destination; and directing the parking platform to release the parked call and route the parked call to the call destination.

9. The method of claim 7, further comprising the step of:

allocating a predetermined number of parking slots to the customer based on the customer order.

10. The method of claim 9, further comprising the step of:

specifying a call treatment application to be applied to calls for the customer parked on at least a portion of the parking slots allocated to the customer.

11. The method of claim 7, further comprising the step of:

reporting at least a portion of the collected call parking data to the customer.

12. The method of claim 7, further comprising the step of:

assigning the parking platform to the call based on the availability of parking slots for said parking platform.

13. In a system for parking a telephone call made to a call destination on a telecommunications switch network, a parking manager comprising:

a parking slot manager configured to manage call parking resources, the resources including parking platforms and parking slots;

a call manager configured to manage the parking of each call to be parked;

a parking slot usage data store coupled to the parking slot manager, the parking slot usage data store configured to store and maintain parking slot status for each parking platform; a parking slot resource data store coupled to the parking slot manager, the parking slot resource data store configured to store and maintain the allocation of parking slots to specific customers;

a call state data store coupled to the call manager, the call state data store configured to store and maintain the status of each call to be parked throughout the parking process; and a destination label/termination address translation data store coupled to the parking slot manager, the destination label/termination address translation data store configured to store and maintain data to translate a destination label to one or more physical network routing addresses.

14. The system of claim 13, further comprising:

a router interface configured to interface the parking slot manager and the call manager to originators of parking requests;

a call center data manager (CCDM) interface coupled to the call manager, said CCDM interface configured to receive customer order data; and at least one parking platform interface coupled to the call manager, each the parking platform interface configured to interface the call manager and a parking platform.

* * * * *